United States Patent
Huntley et al.

(10) Patent No.: US 12,524,283 B2
(45) Date of Patent: Jan. 13, 2026

(54) CRYPTOGRAPHIC AGILITY THROUGH LINK LAYER ABSTRACTION

(71) Applicant: VMware LLC, Palo Alto, CA (US)

(72) Inventors: Sean James Huntley, Dudley (AU); Vasantha Kumar Dhanasekar, Chennai (IN); David E Ott, Chandler, AZ (US); Daniel James Beveridge, Valrico, FL (US)

(73) Assignee: VMware LLC, Palo Alto, CA (US)

( * ) Notice: Subject to any disclaimer, the term of this patent is extended or adjusted under 35 U.S.C. 154(b) by 668 days.

(21) Appl. No.: 17/987,883

(22) Filed: Nov. 16, 2022

(65) Prior Publication Data
US 2024/0061731 A1  Feb. 22, 2024

(30) Foreign Application Priority Data
Aug. 16, 2022 (IN) .............................. 202241046492

(51) Int. Cl.
*G06F 9/54* (2006.01)
*H04L 9/32* (2006.01)

(52) U.S. Cl.
CPC ............ *G06F 9/546* (2013.01); *H04L 9/3239* (2013.01)

(58) Field of Classification Search
None
See application file for complete search history.

(56) References Cited

U.S. PATENT DOCUMENTS

| | | | |
|---|---|---|---|
| 9,946,884 B2 | 4/2018 | Antipa et al. | |
| 10,291,589 B1 | 5/2019 | Sharifi Mehr | |
| 2002/0078348 A1* | 6/2002 | Leung | G06F 21/602 |
| | | | 713/189 |
| 2005/0169475 A1* | 8/2005 | Camus | G06F 21/602 |
| | | | 380/252 |
| 2010/0281270 A1 | 11/2010 | Miyazaki et al. | |
| 2012/0131354 A1 | 5/2012 | French | |

(Continued)

FOREIGN PATENT DOCUMENTS

WO  2020/106973 A1  5/2020

OTHER PUBLICATIONS

International Search Report and Written Opinion received for PCT Patent Application No. PCT/US2022/045578, mailed on Feb. 16, 2023, 13 pages.

(Continued)

*Primary Examiner* — Craig C Dorais
(74) *Attorney, Agent, or Firm* — Quarles & Brady LLP (57) ABSTRACT

This disclosure relates generally to configuring a legacy application or service with a reconfigurable cryptographic provider capable of leveraging many different cryptographic algorithms, protocols or functions. The application or service can be configured with the reconfigurable cryptographic provider by redirecting cryptographic API calls intended for a linked static shared cryptographic library or provider to a cryptographic adapter configured to emulate responses provided by the linked static shared cryptographic library. A cryptographic adapter is also described and is configured to generate abstracted versions of the cryptographic API calls and pass them on to the reconfigurable cryptographic provider, which selects and implements an appropriate cipher solution based on the abstracted cryptographic API calls.

15 Claims, 5 Drawing Sheets

(56) References Cited

U.S. PATENT DOCUMENTS

| | | |
|---|---|---|
| 2017/0006064 A1 | 1/2017 | Agarwal et al. |
| 2019/0273728 A1 | 9/2019 | Sharifi Mehr |
| 2023/0104102 A1 | 4/2023 | Benson et al. |
| 2023/0107763 A1 | 4/2023 | Ott et al. |
| 2023/0109647 A1 | 4/2023 | Ott et al. |
| 2023/0401553 A1* | 12/2023 | Navarro ............. G06Q 30/0206 |

OTHER PUBLICATIONS

International Search Report and Written Opinion received for PCT Patent Application No. PCT/US2022/045588, mailed on Feb. 17, 2023, 8 pages.

* cited by examiner

CRYPTOGRAPHIC AGILITY THROUGH LINK LAYER ABSTRACTION

RELATED APPLICATIONS

Benefit is claimed under 35 U.S.C. 119(a)-(d) to Foreign Application Serial No. 202241046492 filed in India entitled "CRYPTOGRAPHIC AGILITY THROUGH LINK LAYER ABSTRACTION", on Aug. 16, 2022, by VMware, Inc., which is herein incorporated in its entirety by reference for all purposes.

FIELD

The present disclosure relates generally to configuring legacy applications or services with reconfigurable cryptographic providers. In particular, a cryptographic provider associated with the legacy application can be replaced with an adapter that seamlessly interfaces the legacy application with a reconfigurable cryptographic provider.

BACKGROUND

The demand for improvements in cryptography-based security measures continue to increase and scale with the increasing ability of processors to break through and defeat cryptography-based security measures. Substantial increases in processing power associated with the introduction of quantum computing makes these improvements even more necessary. Unfortunately, conventional cryptographic configurations are generally implemented using hard-coded API calls to particular cryptographic features contained in a static cryptographic library implementation. These hardcoded API calls make adapting to the rapidly changing security threat environment slow and costly since programmers are often needed to make manual changes to the software applications and systems to implement changes that keep the software applications and systems secure. Implementing cryptographic feature changes also often requires the systems and applications to be recompiled and/or redeployed. In extreme circumstances, these systems and applications may be forced to reduce functionality or even shutdown until they are able to implement cryptographic features needed to ensure secure operations. Consequently, solutions for reducing the overhead and time needed to implement changes to new and existing applications reliant on secure cryptographic configurations are desirable.

SUMMARY

This disclosure describes policy-governed mechanisms for replacing a cryptographic provider and/or libraries associated with a legacy application with a reconfigurable cryptographic provider setup to be quickly updated in response to emerging cybersecurity threats.

A non-transitory computer-readable storage medium is disclosed. Instructions stored within the computer-readable storage medium are configured to be executed by one or more processors to carry out steps that include: receiving a cryptographic API call; processing the cryptographic API call to generate an abstracted cryptographic API call; transmitting the abstracted cryptographic API call to a current cryptographic provider; and transmitting a response to the software application in a format matching expected legacy cryptographic provider responses.

A cryptographic adapter is disclosed and includes the following: one or more processors; and memory storing one or more programs configured to be executed by the one or more processors, the one or more programs including instructions for: receiving a cryptographic API call from a software application; processing the cryptographic API call to generate an abstracted cryptographic API call; transmitting the abstracted cryptographic API call to a current cryptographic provider; and transmitting a response to the software application in a format matching expected legacy cryptographic provider responses.

A method of operating a cryptographic selection system. The method includes at least the following: receiving a cryptographic API call from a software application; tracking changes in a state of the software application based on the cryptographic API call; processing the cryptographic API call to generate an abstracted cryptographic API call; transmitting the abstracted cryptographic API call to a current cryptographic provider; and transmitting a response to the software application based on a current state of the software application and in a format matching expected legacy cryptographic provider responses.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Certain details are set forth below to provide a sufficient understanding of various embodiments of the invention. However, it will be clear to one skilled in the art that embodiments of the invention can be practiced without one or more of these particular details. Moreover, the particular embodiments of the present invention described herein are provided by way of example and should not be used to limit the scope of the invention to these particular embodiments. In other instances, hardware components, network architectures, and/or software operations have not been shown in detail in order to avoid unnecessarily obscuring the invention.

Cryptographic frameworks and algorithms are a foundation of security protocols used in many software applications and systems for secure communications. Due to cyber security threats from quantum computing, malware, phishing, and the like to secure communications, cybersecurity algorithms are constantly evolving to protect against evolving cyber threats. Updating software applications or systems to incorporate the latest cybersecurity algorithms and security protocols using existing interfaces can be complicated and may require a user or an organization to spend a considerable amount of time. In addition to constantly updating the cryptographic algorithms and security protocols, software applications may be required to support alternative cryptographic algorithms and/or security protocols depending on state or context of the user using the applications or system, a state of the device used by the user for accessing resources, and the like. For example, some relatively weaker or even compromised algorithms (e.g., RSA) may need to be replaced with stronger algorithms when a user is trying to access a resource from a network in a high security threat area following general availability of new/more effective cryptographic exploitation tools such as those that may eventually be available using quantum computers. Accordingly, depending on the circumstances surrounding a user or a user device, different algorithms from a range of cryptographic algorithms may be required for protecting secure data. Directly incorporating the latest advanced algorithms within existing systems or applications may require extensive work at significant cost and the implementation may cause delays if the algorithm is not widely accepted. Modifying every single application on a large scale to rapidly adopt existing cryptographic frameworks to arising threats is complex and costly.

Cryptography-based security measures can be improved by configuring the cryptographic frameworks, upon which the security measures are based, with the ability to quickly make updates and adjustments. For example, the proposed embodiments allow a compromised cryptographic feature employed by an existing application to be quickly replaced with a more secure and/or more efficient cryptographic feature. The ability to rapidly reconfigure the cryptographic frameworks also allows the cryptographic frameworks to be configured to leverage different features or entire cryptographic libraries based on specific use cases. For example, in response to a request for services from a device operating outside of a trusted computer network, the service could be configured to leverage more secure cryptographic features and/or libraries in order to satisfy security policies. This ability for the cryptography framework to agilely reconfigure allows users operating on more secure networks or from more secure locations to benefit from lower overhead cryptography, while maintaining higher security only when needed.

Older or legacy applications often use dynamically linked shared cryptographic libraries for handling cryptographic API calls. One solution for updating these libraries with cryptographically agile solutions is to redirect the cryptographic API calls being made by the legacy applications to a cryptographic adapter. The cryptographic adapter is then configured to genericize the cryptographic API calls and forward on abstracted cryptographic API calls that instead of requesting specific cryptographic features only describe an intent of the cryptographic API call. The abstracted cryptographic API calls are then received by a cryptographically agile cryptographic provider that includes an interpreter or implementation engine capable of transforming the cryptographic intent expressed by the abstracted cryptographic API calls into a cipher solution able to fulfill the cryptographic intent. Since the cryptographic adapter is limited to passing on the cryptographic intent of the legacy application, only the cryptographically agile cryptographic provider needs to be periodically updated with the latest cryptographic features as time goes on to keep the operation of the legacy application current.

In addition to passing the abstracted cryptographic API calls on to the cryptographically agile cryptographic provider, the cryptographic adapter is also responsible for maintaining a seamless connection with the legacy application. Doing so often requires the cryptographic provider to track a state of the legacy application so that the cryptographic adapter is able to send transmissions to the legacy application consistent with the transmissions the legacy application previously received from its dynamically linked cryptographic library or libraries. This often requires the cryptographic adapter to spoof certain return values during cryptographic operations. For example, when adapting legacy applications configured to manage their own certificates, the cryptographic adapter can be configured to provide an emulated certificate to the legacy application while allowing the cryptographic provider to use a more efficient and/or secure certificate when performing cryptographic operations.

It should also be appreciated that while the cryptographic provider is generally equipped to provide each of the responses expected in response to the cryptographic API calls made by the legacy application, that a new cryptographic selection system made up of the aforementioned cryptographic adapter and cryptographic provider can be configured to consolidate multiple cryptographic API calls into a smaller or larger number of API calls in instances where the updated cryptographic features require it.

These and other embodiments are discussed below with reference to FIGS. 1-5. Those skilled in the art, however, will readily appreciate that the detailed description given herein with respect to these figures is for explanatory purposes only and should not be construed as limiting.

Figure 1:
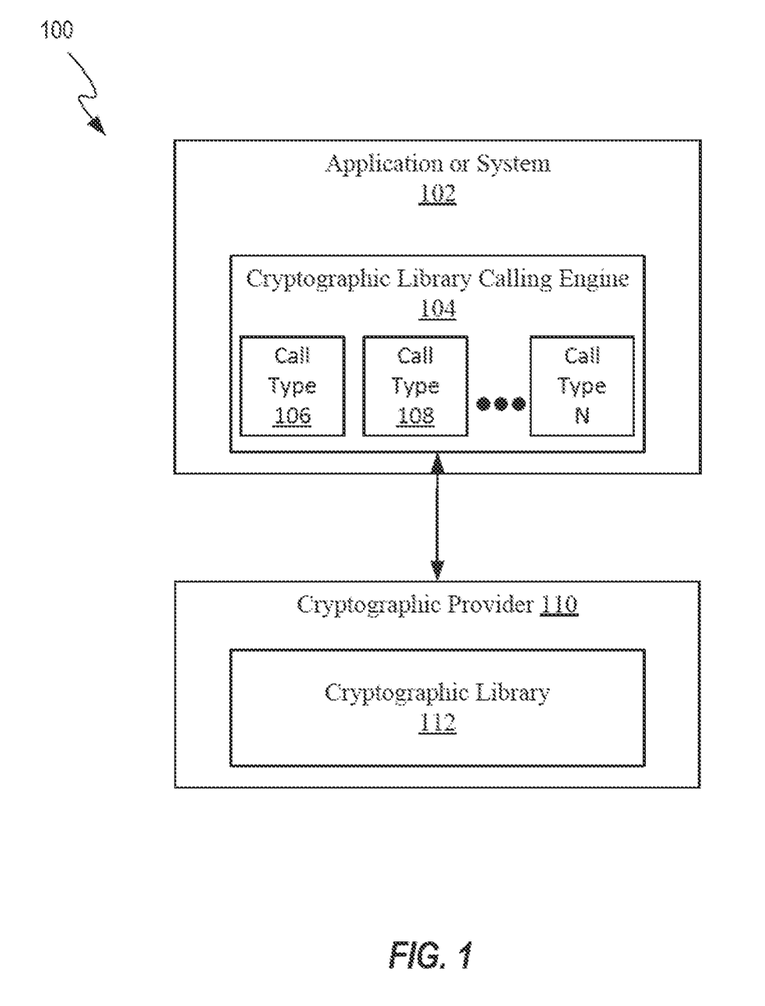
FIG. 1 shows a block diagram illustrating a cryptographic provider associated with a software application.

FIG. 1 shows a block diagram 100 illustrating a software application or system 102 equipped with a conventional cryptographic provider 110. Application 102 generally includes a cryptographic library calling engine 104 configured to transmit cryptographic API calls to a dynamically linked cryptographic provider 110. In some embodiments, calling engine 104 can take the form of a software development kit that is responsible for transmitting API calls of various call types such as call types 106 or 108 to the dynamically linked cryptographic provider 110. Cryptographic provider 110 includes a cryptographic library 112 that includes a number of cipher suites. Each of the cipher suites typically includes multiple related ciphers that can be implemented alone or in combination to implement one or more types of cryptographic calls necessary to support operation of application 102. The cryptographic features enabled by cryptographic provider 110 are generally implemented by hard coding references to specific cryptographic features supported by cryptographic provider 110 into application 102. The hard coded references to cryptographic features makes any updates to the many features and protocols supported by cryptographic provider 110 a manual and time consuming process.

Figure 2:
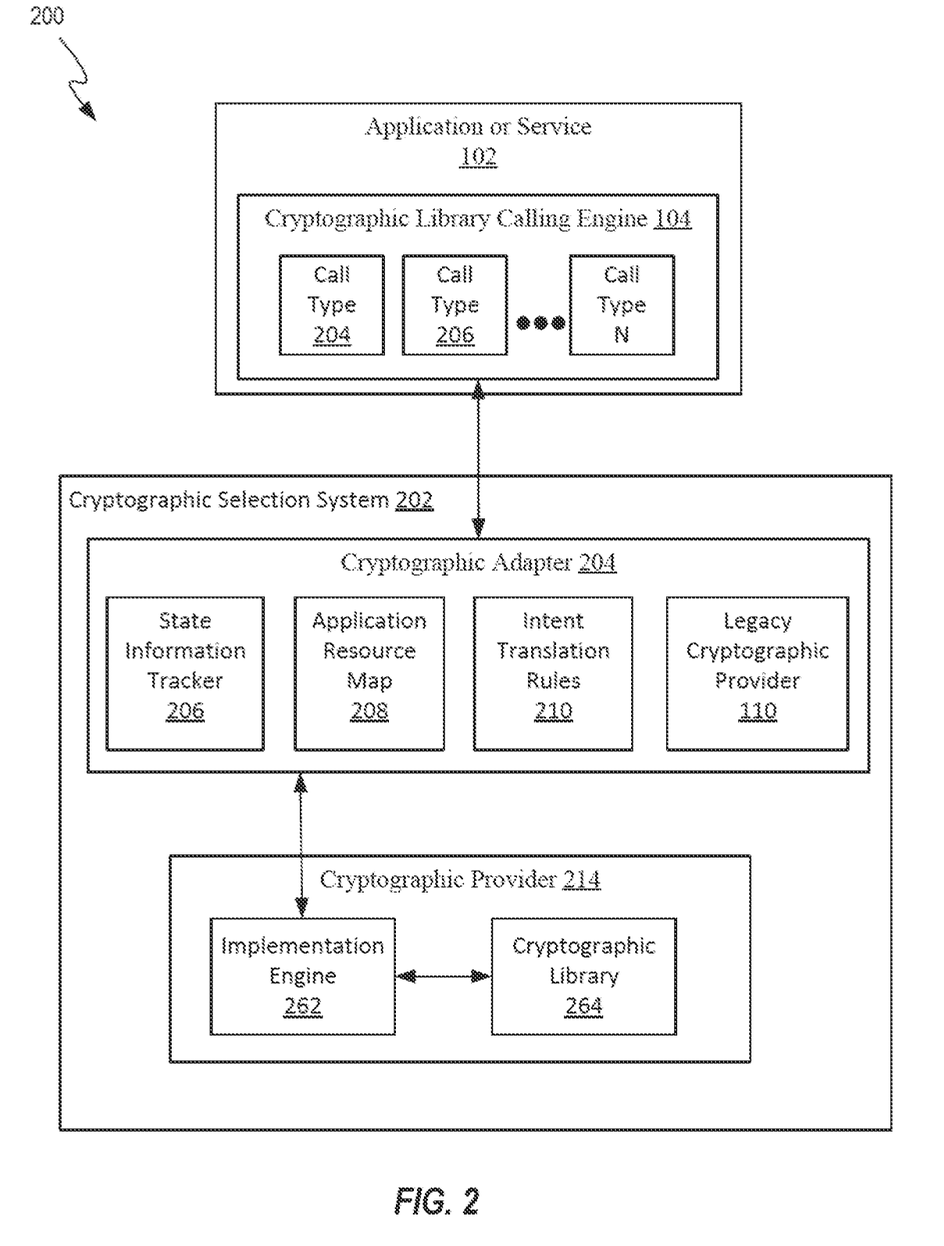
FIG. 2 shows a block diagram illustrating the software application configured with a cryptographic selection system, in accordance with the embodiments described herein.

FIG. 2 shows a block diagram 200 in which the conventional cryptographic provider 110 used by application 102 is replaced by a cryptographic selection system 202. Cryptographic selection system 202 includes a cryptographic adapter 204 that is configured to respond to and interact with application 202 in a manner that corresponds with the responses and interaction provided by cryptographic provider 110. While cryptographic selection system 202 is often co-located with and may even share the same virtual machine (VM) as application 102, in certain instances cryptographic selection system 202 can be located outside the VM occupied by application 202 or even on a different computer or server as long as the cryptographic selection system 202 is able to establish a trusted link with application 102. The depicted configuration allows cryptographic selection system 202 to replace a legacy or outdated cryptographic provider 110 with very little or sometime no changes at all being made to application 102. In order to accomplish this goal, cryptographic adapter 240 can include multiple modules that assist it in responding appropriately to a variety of cryptographic API calls in a manner consistent with the legacy cryptographic provider 110.

A first one of the modules of cryptographic adapter 210 can be a state information tracker 206 that is responsible for tracking a state of application 102. For example, the state information tracker can be responsible for tracking caller vs actual library handles. State information tracker 206 can also be responsible for tracking the use of differing types of certificates. This can be particularly important where application 102 is only capable of using limited types of certificates and cryptographic provider 104 is using a certificate type that application 102 is not configured to use. In this situation, state information tracker 244 would be configured to identify that application 102 requested the use of a first type of certificate, e.g. an RSA certificate, and cryptographic provider 260 is using a second type of certificate, e.g. a Dilithium certificate. Since cryptographic adapter 204 is aware that application 102 is expecting to receive messages consistent with the first type of certificate it can create an emulated certificate that is consistent with a certificate of that first type when passing messages back to application 102. Cryptographic adapter 204 can also be configured to keep track of whether application 102 believes it is using a direct or a proxy connection as cryptographic provider 214 may use proxies in circumstances where doing so is deemed necessary to secure operations of application 102. In situations where application 102 requests the use of a specific cipher suite, state information tracker 206 can keep track of the requested cipher suite so that any responses that are sent back are in a format consistent with the use of the requested cipher suite.

Cryptographic adapter 204 can also include an application resource map 208. Application resource map 208 can contain information that helps cryptographic adapter 204 communicate with and properly address the requests received from cryptographic library calling engine 104. In some embodiments, application resource map 208 can include information about various features of application 102. The information can allow application resource map 208 to identify the operation requested by the application for a given session and map the operation to a correct underlying provider structure such as, e.g., a particular set of certificates public keys, private keys or session keys. In this way, application resource map 208 helps cryptographic adapter 204 to more effectively facilitate communications between application 102 and cryptographic provider 214 by helping cryptographic provider emulate the behavior of legacy cryptographic provider 110. For example, application 102 may request particular certificate properties such as subject name, certificate validity, etc. Using the information stored in application resource map 208 cryptographic adapter 204 is able to access the actual certificate being used and then translate the information from the actual certificate into the format application 102 is expecting so that application 102 continues to run without realizing that cryptographic adapter 204 is leveraging a different type of certificate and/or protocol.

Cryptographic adapter 204 can also include intent translation rules 210, which include a set of rules that help to process cryptographic API calls received from application 102. For example, in the event an application selects a particular type of encryption for use, instead of simply passing along the specific type of encryption requested to cryptographic provider 214, cryptographic adapter 204 can instead pass on an abstracted cryptographic request that gives cryptographic provider 214 more flexibility in its selection of the type of encryption used. This can be beneficial in the case where at the time application 102 was written cryptographic techniques in general use were at a substantially lower security level. For example, in the event a medium level of encryption was 64 bits at the time that application 102 was originally written, instead of passing on a request for 64 bit encryption cryptographic adapter 204 would pass along a request for a medium level of encryption. Alternatively, the cryptographic adapter can determine the 64 bit encryption is a medium level in the event application 102 also used 32 bit and 128 bit encryption depending on the situation. Cryptographic provider 214 can be continuously or periodically updated so it is aware of what types of cryptographic features correspond to low, medium or high levels of security. Accordingly, cryptographic provider 214 could then apply 128 bit, 256 bit encryption or higher bit levels depending on current security standards. The intent translation rules can similarly interpret requests for particular types of encryption certificates in terms of what level of security is desired rather than the particular type of certificate being requested by application 102. For example, in some use cases a cryptographic provider 214 can be configured to use a Dilithium certificate instead of an RSA certificate as application 102 may be requesting. Since cryptographic provider 214 only receives a level of security needed instead of specific instructions, cryptographic provider 214 is able to select the most effective and efficient combination of cryptographic resources to address the cryptographic effects needed by application 102. Intent translation rules 210 can also be configured to process multiple cryptographic API calls and determine that multiple cryptographic API calls can be consolidated into a smaller number of abstracted API calls.

In some embodiments, cryptographic adapter 204 can also include a copy of legacy cryptographic provider 110, which was previously hard-coded to work with application 102. Legacy cryptographic provider 110 can be kept maintained in the event that the cryptographic solution being employed by cryptographic provider 214 is no longer functioning correctly or in the event updates need to be made to cryptographic provider. In some embodiments, after a fault is detected where cryptographic adapter 204 is forced to employ legacy cryptographic provider 110, developers can make an update to cryptographic adapter 204 to prevent it from having to rely upon cryptographic provider 110 to handle the same type of cryptographic API call going forward. Legacy cryptographic provider 110 can also be configured to be activated for particular types of cryptographic calls known to be incompatible with cryptographic API 214. In some embodiments, cryptographic API 214 can be configured to only replace the standard function of legacy cryptographic provider 110 for communications-related cryptographic APIs and/or when applying encryption to storage at rest. In some embodiments, cryptographic adapter 204 could also be configured to utilize legacy cryptographic provider 110 when operations are at low risk of compromise. For example, when application 102 was operating entirely within an organization's intranet, cryptographic adapter 204 could be configured to allow all cryptographic API calls to be handled by legacy cryptographic provider 110.

Figure 3:
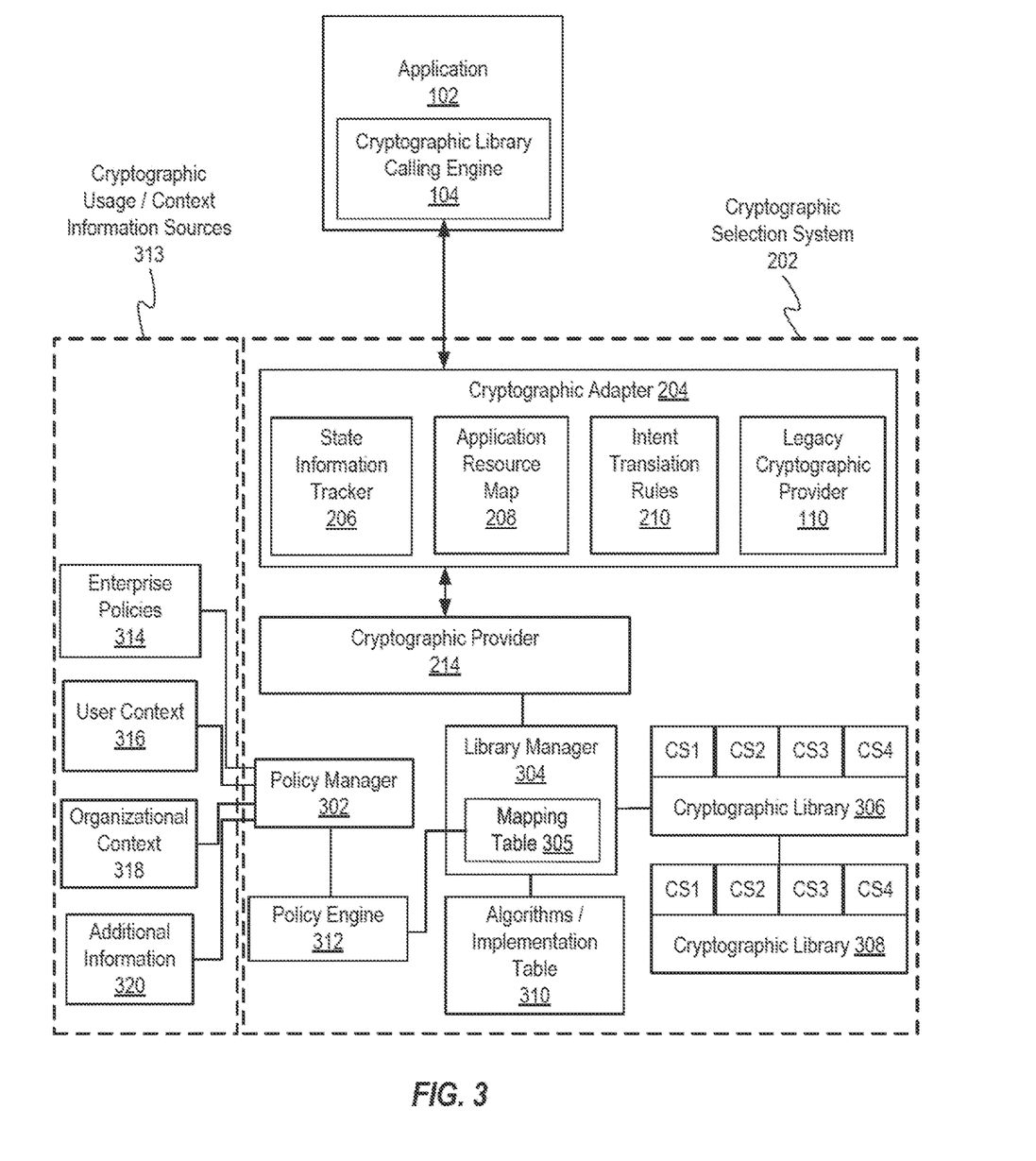
FIG. 3 shows a block diagram illustrating a cryptographic provider with a more complex cryptographic selection system.

FIG. 3 shows a block diagram illustrating software application 102 that configured with a more complex cryptographic selection system 202 in accordance with the described embodiments. Application 102 includes cryptographic library calling engine 104 for generating cryptographic API calls when operation of application 102 requires a cryptographic feature such as, e.g., digital signatures, encryption or some other form of cryptographic protocol. After generating the cryptographic API calls, cryptographic library calling engine is configured to transmit the cryptographic API calls to cryptographic adapter 204. Cryptographic adapter 204 can be configured to intercept the cryptographic API calls by hooking the calls from a dynamic linked library at the link layer and/or by analyzing low level calls at the OS layer, which allows for interpolation of the cryptographic API calls. As previously described in the text accompanying FIG. 2, cryptographic adapter 204 processes the cryptographic API call generated by application 102 to produce an abstracted cryptographic API call that describes an intent of the original cryptographic API call. After generating the abstracted cryptographic API call, cryptographic adapter 204 transmits the abstracted cryptographic API call to cryptographic provider 214. FIG. 3 shows cryptographic provider 214 leveraging a library manager 304 to select a cryptographic feature or features corresponding to the abstracted cryptographic API call in lieu of the implementation engine 262 depicted and described in FIG. 2.

Cryptographic provider 214 processes abstracted API calls received from the cryptographic adapter 204 and interacts with library manager 304 to assist in selecting and executing the abstracted cryptographic API calls generated by application 102. While cryptographic provider 214 begins by trying to identify a cipher solution matching the original intent expressed in the abstracted cryptographic API call, in certain instances, rules contained within mapping table 305 may require elevation of the security level for a particular request based on the context of use as will be described in greater detail below.

Library manager 304 is configured to manage one or more cryptographic libraries. While library manager 304 is depicted managing cryptographic libraries 306 and 308 it should be appreciated that library manager 304 can be configured to manage any number of cryptographic libraries needed to support the operation of application 102. Library manager 304 is responsible for providing access to one or more cryptographic features included in cryptographic libraries 306 and 308 in response to the API calls received by cryptographic provider 214. Library manager 304 is also configured to assist with updating existing cryptographic features and registering new cryptographic features. A cryptographic feature can take the form of a cryptographic algorithm, protocol, function, or combination of cryptographic algorithms, protocols or functions.

In some embodiments, library manager 304 includes a mapping table 305, which associates particular cryptographic features with tags configured to associate the cryptographic features contained within cryptographic libraries 306 and 308 with particular functions and capabilities. Whenever updates are made to one of cryptographic libraries 306 and 308, library manager 304 is configured to update mapping table 305 to associate any new or updated cryptographic features with one or more tags.

New cryptographic features can be added to cryptographic selection system 210 by first referencing algorithms/implementation table 310, which can include a listing and/or locations of all potential cryptographic algorithms, libraries, functions, rules and the like compatible with cryptographic provider 214 and then selecting one or more cryptographic features from algorithms/implementation table 310 for registration with cryptographic selection system 210. It should be noted that, while algorithms/implementation table 310 is depicted as being directly attached to library manager 304, algorithms/implementation table 310 can also be maintained and/or stored at a location outside of an attached storage or a local network.

In some examples, library manager 304 can be managed using a user interface operated through application 102 and/or through another more centralized management application responsible for managing multiple applications. The user interface allows a user to register one or more new cryptographic features listed in algorithms/implementation table 310 to update cryptographic selection system 210. For example, an administrator could access the user interface to configure one or more of the cryptographic libraries with cipher suites supporting different bit rates or types of encryption.

Policy manager 302 is responsible for managing policy engine 312. Policy engine 312 can take the form of a user-defined and/or autonomously compiled list of policies that establish rules for the operation of cryptographic selection system 210. Policy engine 312 can be implemented as a rule engine, a table, a neural network or the like. The list of policies stored in policy engine 312 affect how library manager 304 of cryptographic provider 214 operates to manage implementation of various cryptographic features included in cryptographic libraries 306 and 308. When an API call is received at cryptographic provider 214, cryptographic provider 214 leverages the list of policies contained in policy engine 312 and managed by policy manager 302 to select one or more cryptographic feature suitable for handling the abstracted cryptographic API call. While the effect of the policies stored within policy engine 312 are generally implemented by library manager 304 through updates it makes to mapping table 305, in some embodiments cryptographic provider 214 can be in direct communication with policy manager 302. This direct link can be used to request policy manager check cryptographic usage/context information sources 313 for any recent updates that could effect policies stored in policy engine 312. In some embodiments, policy engine 312 specifies a particular cryptographic feature or features contained within one of cryptographic libraries 306 and 308 for use in response to an API call.

In some embodiments, a policy associated with the API call specifies a tag identifying a solution class defined and maintained within mapping table 305. The identified cryptographic feature or tag is then transmitted to library manager 304. In the case a tag is transmitted to library manager 304, library manager 304 uses mapping table 305 to identify which cryptographic feature or features is associated with the tag. Library manager 304 then instructs cryptographic provider 214 which cryptographic feature or features to implement in response to the abstracted cryptographic API call. It should be noted that in some embodiments an API call can be associated with multiple tags. This set of cryptographic features used in responding to the API call can be referred to as a cipher solution. This system of using tags associated with functionality in the policy engine instead of particular cryptographic functions allows library manager 304 and policy manager 302 to operate independently from one another. This reduces the need for coordination between the library and policy managers outside of passing tags from the policy manager to the library manager. It should be noted that while FIG. 3 shows any communication between the library manager and policy manger are routed through cryptographic provider 214, in some embodiments, a communication can be routed directly between policy manager 302 and library manager 304.

In some embodiments, the abstracted cryptographic API call can take the form of a request for data encryption of a particular type of data. A first policy associated with the API call can specify that the encryption for that type of data be of a specific type (e.g., FIPS compliant encryption) and a second policy associated with the API call can specify that the encryption be of a minimum security strength (i.e. number of bits) or key size for the specified type of data associated with the API call.

In some embodiments, policy engine 312 can be managed at least in part autonomously by making changes to enterprise policies 314. Enterprise policies 314 is one of cryptographic usage/context information sources 313 and are generally managed by a network administrator, allowing for hierarchical network-wide implementation of policies for managing multiple applications having cryptographic frameworks in accordance with the described embodiments. In some embodiments, policy engine 312 can include policies selected based on user context 316, organizational context 318 and/or additional information 320. User context 316 can include data such as a user's location, the user's identity, the nature of the data to be protected, the user's access level, the speed and/or characteristics of the local network the user is accessing, the geographic location of the user, the application context and more. In embodiments where policy engine 312 includes tags identifying particular desired functionalities, in lieu of specifying particular cryptographic features, policy engine 312 assigns the policies it manages tags configured to meet security requirements specified by the enterprise policies.

In some examples, user context 316 would be supplied to cryptographic provider 214 to assist in selection of the right cryptographic feature to meet a respective abstracted cryptographic API call. For example, a policy stored within policy engine 312 could specify that higher minimum levels of encryption are required for users operating outside of a trusted network environment. The higher minimum level of encryption can be specified by a particular tag in the policy corresponding to a specific level of encryption associated with that tag and identified in mapping table 305. When user context 316 indicates the user is operating outside the trusted network, that higher minimum level of encryption rule would be applied when cryptographic provider 214 is selecting a suitable cryptographic feature for responding to a respective API call. In an instance as described above where the policies indicate a requirement for high levels of encryption, an original cryptographic API call requesting only medium levels of encryption would be overridden to comply with the security policies.

In some examples, entire cryptographic libraries can be dedicated to handling API calls associated with users of a specific type or operating from a particular location. Organizational context 318 can apply in a similar manner to user context 316. For example, applications grouped under a first organization might have a different set of policies than applications grouped under a second organization. These types of policies would generally be implemented by an information security IT team for each organization. For example, the organizational policies might specify different cryptographic features be used in different regions of the world or that different cryptographic features be used based on which business sector or project the request for access is associated with. In some embodiments, certain policies such as FIPS compliant cryptography could be required for all communications associated with a particular company or organization.

Additional information 320 can include other types of contextual information, such as, for example, certificate alert information for a particular usage context (e.g. transactions utilizing systems running Windows 10 versions a threshold number of versions old and/or versions containing a known critical security vulnerability can be identified as they may require additional security mitigation).

Figure 4:
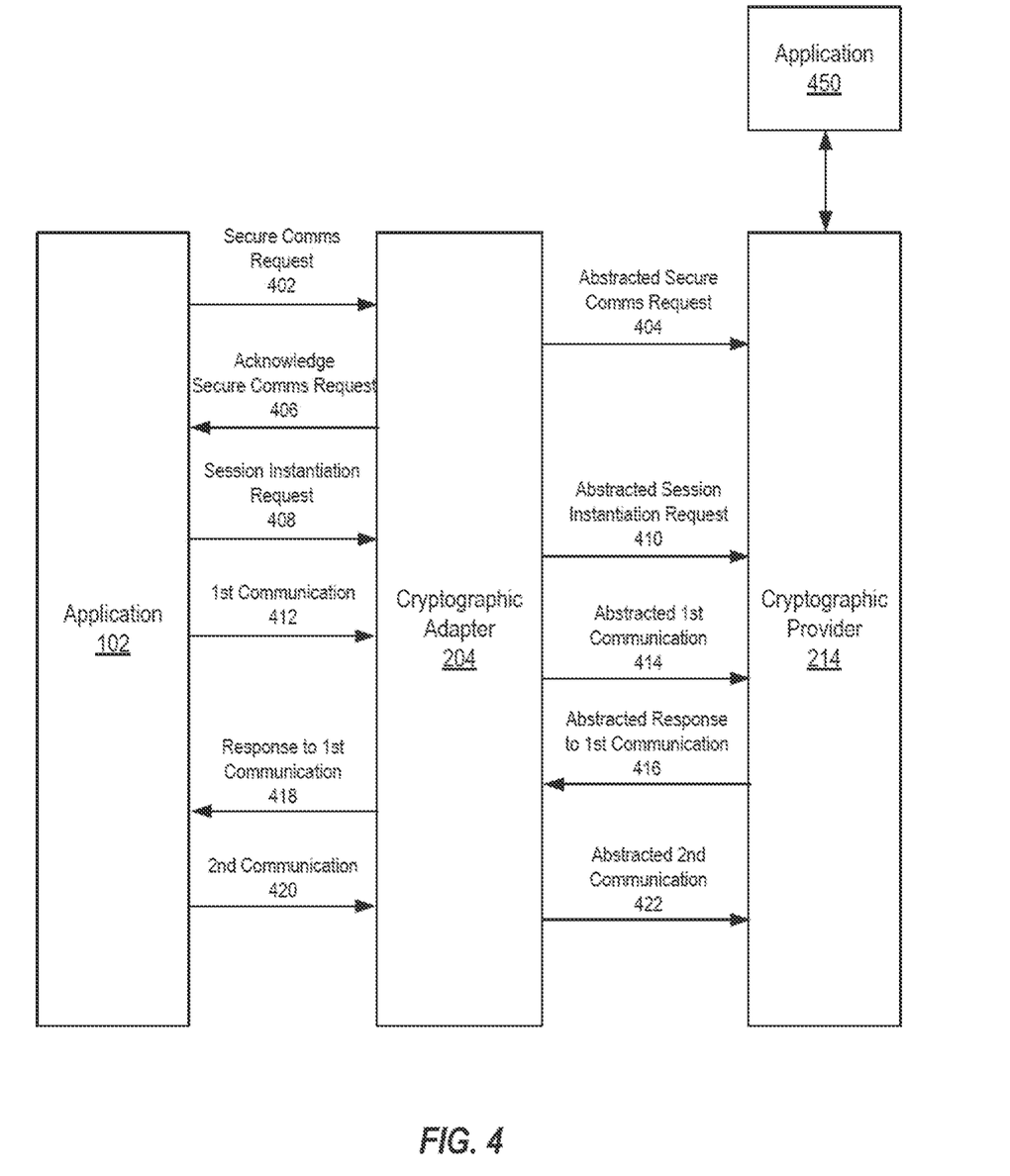
FIG. 4 shows a series of communications made between the software application and a cryptographic adapter when establishing secure communications.

FIG. 4 shows a block diagram illustrating a series of exemplary communications made between application 102, cryptographic adapter 204 and cryptographic provider 214 after application 102 initiates a secure communications request. In this exemplary case, application 102 is originally configured to leverage OpenSSL for secure communications and the following description describes how cryptographic adapter 204 and cryptographic provider 214 instead leverage the more secure gnnutls protocols. Table (1) shows exemplary differences in code associated with Open SSL and gnnutls protocols.

TABLE 1

| Program | OpenSSL | gnnutls |
|---|---|---|
| 1) TLS Server code | 1) Create a server context & set the certificate of the server. Change the global crypto configs for all the connection<br>SSL_CTX_new<br>SSL_CTX_use_certificate_file<br>SSL_CTX_use_PrivateKey_file<br>SSL_CTX_set_verify<br>2) Create a session for accepting an incoming connection. Change per session related crypto-config<br>SSL_new<br>SSL_set_fd<br>SSL_accept → Handshake<br>3) Read/Write Operations<br>SSL_read<br>SSL_write | 1) Create a server context & set the certificate of the server. Change the global crypto configs for all the connection<br>gnutls_certificate_allocate_credentials<br>gnutls_certificate_set_x509_trust_file<br>gnutls_certificate_set_x509_key_file<br>2) Create a session for accepting incoming connection. Change per session related crypto-config<br>gnutls_init<br>gnutls_credentials_set<br>gnutls_transport_set_int<br>gnutls_handshake<br>3) Read/Write Operations<br>gnutls_record_recv<br>gnutls_record_send |

TABLE 1-continued

| Program | OpenSSL | gnnutls |
|---|---|---|
| 2) TLS client code | 1) Create a client context with crypto config<br>SSL_CTX_new<br>2) Create a session & set the socket to perform TLS read/write<br>SSL_new<br>SSL_set_fd<br>SSL_connect -→ handshake<br>3) Read/Write Operations<br>SSL_write<br>SSL_read | 1) Initial a client session with crypto config<br>gnutls_init<br>2) Server name & verification setting to complete TLS connection<br>gnutls_server_name_set<br>gnutls_session_set_verify_cert<br>gnutls_transport_set_int<br>gnutls_handshake<br>3) Read/Write Operations<br>gnutls_record_send<br>gnutls_record_recv |

FIG. 4 shows how a secure communications request 402 is received from application 102 at cryptographic adapter 204. For example, in the case application 102 is leveraging OpenSSL, the call can include as many as four different calls to create a server context as is shown in Table (1). The four calls for Open SSL can include an SSL_CTX_new call an SSL_CTX_use_certificate_file call, an SSL_CTX_use_PrivateKey_file and an SSL_CTX_set_verify call. Cryptographic adapter 204 can be configured to aggregate the data from the calls received from application 102 and package the secure communications request into a smaller number of calls to generate an abstracted secure communications request 404. In one particular embodiment, abstracted secure communications request 404 can take the form of a single call to cryptographic provider referred to as a create_server_context call that includes relevant parameters from the multiple calls received from application 102. The parameters can include only the parameters needed by cryptographic provider 214 in a format that is readable and readily understood by cryptographic provider 214. For example, the create_server_context call can include one parameter related to the certificate and another parameter related to the private key file. It should also be appreciated that not all of the calls received from application 102 are passed on to cryptographic provider 214. For example, an SSL_CTX_verify call generally pertains to specifying the callback function to be used. This information can be stored in previously described state information tracker 206 so that cryptographic adapter knows how to format any callback functions requested by application 102. An exemplary callback function taking the form of an acknowledgement of the secure communications request 406 from cryptographic adapter 204 to application 102 is depicted. In addition to incorporating parameters derived from the cryptographic calls received from application 102, the create_server_context call can also include other parameters. For example, the use of OpenSSL on its own could help cryptographic adapter 204 identify an implicit security level to associate with the create_server_context call. Accordingly, the create_server_context call could include a parameter indicating a level of security desired for the secure communications. The desired security level parameter could take a numeric form or a more qualitative parameter such as a high, medium or low security level indicium.

Once abstracted secure communications request 404 is received at cryptographic provider 214, cryptographic provider 214 can interface with the library manager (see FIG. 3 discussion) to identify one or more appropriate cryptographic libraries and/or features to utilize in establishing the requested secure communications request. In the event that cryptographic provider 214 selects gnnutls to facilitate the secure communications request, the parameters included in the create_server_context call could be extracted to create one or more calls to establish a server context and set a certificate for the server. As shown in Table (1) these new calls could take the form of a gnutls_certificate_allocate_credentials call, a gnutls_certificate_set_x509_trust_file call and a gnutls_certificate_set_x509_key_file call, which are implemented by cryptographic provider 214 to establish the server context using gnnutls. It should be appreciated that cryptographic provider can also use abstracted secure communications request 404 to generate cryptographic calls associated with any other protocol that is selected using cryptographic selection system 202. The create_server_context call makes this possible by putting parameters in a location/format that allows cryptographic provider 214 to efficiently extract and utilize the information provided by the parameters to generate new calls compatible with the framework it selects to implement the secure communications. In this way, cryptographic provider 214 doesn't have to have any knowledge about the inner workings of application 102 and can rely on cryptographic adapter to deal with any particular peculiarities specific to application 102. In some embodiments, cryptographic adapter 204 can be specifically designed to interface with a particular set of applications that includes application 102. The set of applications would generally share a set of common features. For example, cryptographic adapter 204 could be configured to interface with communications applications leveraging OpenSSL. In this manner, cryptographic provider 214 can be somewhat standardized to handle any or at least most applications and a developer wishing to modernize or update their cryptographic features would only have to find a corresponding cryptographic adapter to interface cryptographic provider 214 with their application. In some embodiments, minor changes may need to be made to application 102 in order to realize full compatibility with a particular cryptographic adapter. For example, cryptographic calls made by application 102 might need to be updated to identify certain parameters and/or calls that are output or formatted in an at least slightly non-standard manner. In this way a number of applications that are compatible with a particular cryptographic adapter can be increased.

After establishing the server context, application 102 will also generally send out cryptographic calls to create a session for accepting an incoming connection from the entity it's trying to connect with. In this exemplary embodiment, application 102 is trying to connect and communicate with application 450. Application 450 can be any application that accepts a request to establish a secure communications channel with application 102 and cryptographic provider 214, in this embodiment, is configured to relay communications between application 102 and application 450. In the event application 102 is using OpenSSL, a typical session instantiation request 408 would include an SSL_new call, a SSL_set_fd call and an SSL_connect call for initiating the TLS/SSL handshake with the server as shown in Table (1) above. The abstracted session instantiation incorporates any necessary parameters into a single create_session call to cryptographic provider 214. The create_session call is responsible for delivering sufficient information needed to make a socket assignment and set up the cryptography configuration in accordance with a configuration file that can be stored within or otherwise associated with previously described application resource map 208. In some embodiments, the configuration file can be stored external to cryptographic adapter 204, which can have a link providing it access to the contents of the configuration file. As shown in Table (1) again the gnnutls cryptographic calls are again different from those used with OpenSSL and can include a gnutls_init call, a gnutls_credentials_set call, a gnutls_transport_set_int call and a gnutls_handshake call.

Once the server context and session are created, application 102 and application 450 can proceed with initiating secure communications represented by representative communications 412-422. Cryptographic adapter 204 will still be responsible for abstracting the send and receive commands since as shown in Table (1) there are differences between the send and receive commands used by OpenSSL and gnnutls. It should also be noted that communications passed back by cryptographic provider 214 can be abstracted or maintained in a native cryptographic framework formatting. Generally the call backs to cryptographic adapter 204 from cryptographic provider 214 will also be abstracted so that cryptographic adapter 204 does not need to be configured with logic capable of parsing communications associated with each of the cryptographic frameworks that cryptographic provider 214 is capable of utilizing. This also avoids a situation in which cryptographic adapter 204 would need to be updated every time cryptographic provider 214 is updated with a new library or set of cryptographic functions.

It should also be appreciated that cryptographic provider 214 and cryptographic adapter 204 could also work with application 102 to respond to a communications request initiated by application 450. In such an embodiment, cryptographic adapter 204 would be configured to receive the OpenSSL client code shown in Table (1) and generate an abstracted cryptographic call that would be interpreted by cryptographic provider 214 to create a client context configuration and client session to support the requested secure communications.

While FIG. 4 provides a detailed example describing how the described embodiments can be used to implement secure communications, it should be appreciated that the scope of the described embodiments is not limited to secure communications. The described cryptographic adapter/provider configuration can also be used to perform other types of cryptographic functions. For example, this configuration can include APIs that allow the configuration to perform encryption at rest and/or perform hashing operations. Furthermore, an application can be equipped to work with multiple cryptographic adapters that are each configured for supporting different cryptographic features of an application.

In the use case of performing encryption at rest, the cryptographic adapter would receive a request from the application to write to a storage medium, e.g., a database. This request often takes the form of a very specific function call that is tightly coupled to the type of database the application expects to utilize. The cryptographic adapter would then map the request to a more general write function that could then be applied by the cryptographic provider to adopt a desired level of encryption. It should be noted that in this use case, it's important that the cryptographic adapter keeps track of the context relating to how the application is storing the data to avoid a situation in which operation of the cryptographic adapter diverges from the intent of the application. In addition to allowing the application to write to the storage medium, this configuration can also allow for making periodic updates to the encryption keys. In some embodiments, the updates to the encryption keys can be decoupled from the application requests to update the encryption keys. For example, a security policy associated with the cryptographic provider can require a more or less frequent interval at which the keys need updating. In that event, the cryptographic adapter could be configured to report encryption key updates being performed to the application at a desired time when in fact the cryptographic provider is performing the encryption key updates on a different schedule.

Figure 5:
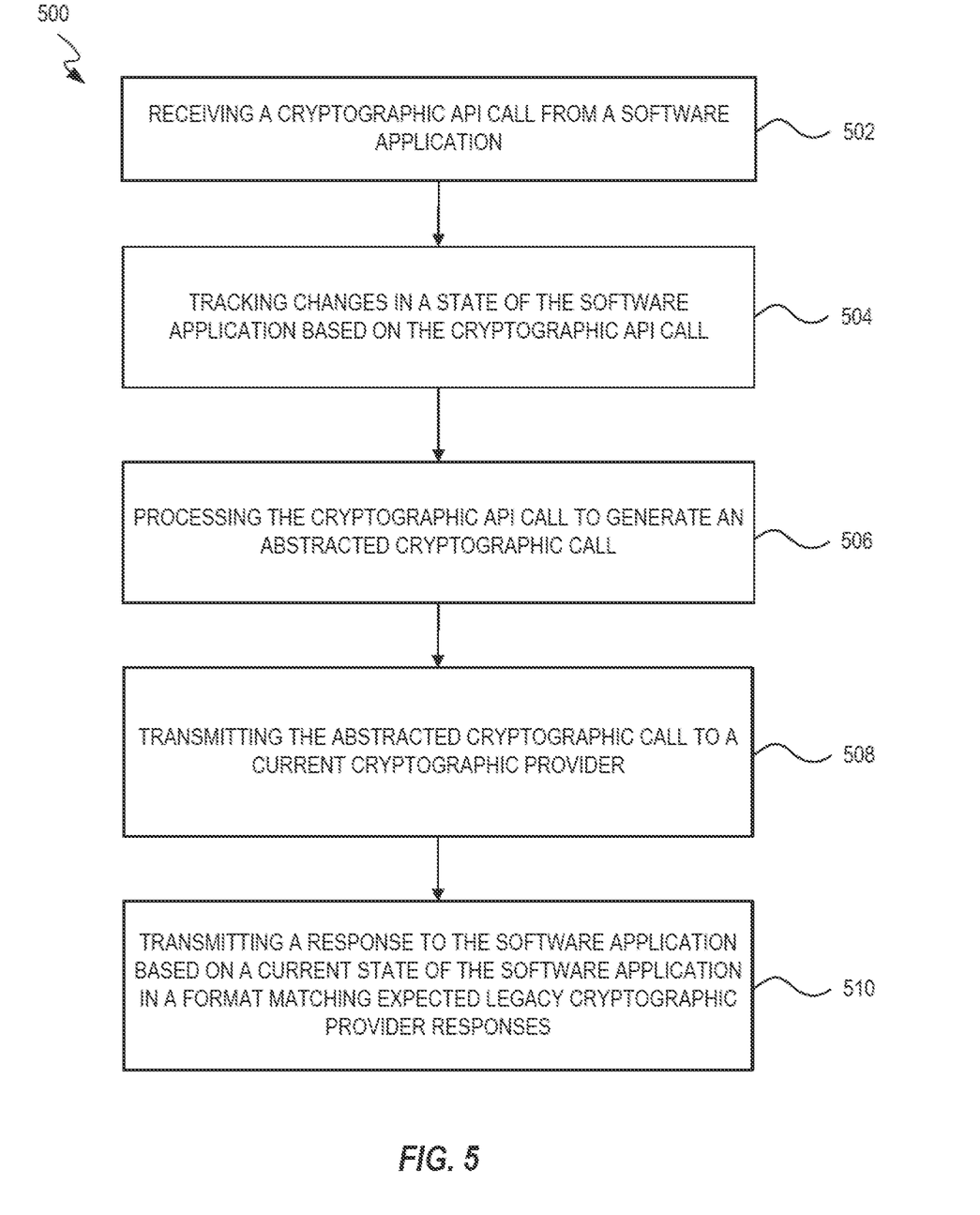
FIG. 5 shows a flow diagram illustrating a process for operating a cryptographic selection system.

FIG. 5 shows a flow diagram illustrating a method for receiving and processing a cryptographic API request made by a software application and received at a cryptographic adapter. At step 502, a cryptographic API call associated with a request for cryptographic operations is received. Cryptographic operations can take many forms. In some embodiments, the cryptographic operations can take the form of encryption that facilitates secure access to one or more computing resources on a computer network. Cryptographic operations can also be applied to a particular file or object. For example, the cryptographic operations could take the form of applying a digital signature or encryption to an email. It should be noted that the cryptographic selection system can also be initiated in response to an event trigger. For example an event trigger could fire in response to a rules change or a change in the manner an application or web service is being used. At step 504, changes in a state of the software application indicated by the cryptographic API call can be monitored and are generally at least temporarily recorded. In particular, a recent history of the cryptographic API calls made by the software application can be maintained so that subsequent interaction with the software application can be consistent with previous cryptographic API calls.

At step 506, the cryptographic API call is processed at the cryptographic adapter. The cryptographic adapter generates an abstracted API call after processing the cryptographic API call that defines a cryptographic intent of the original cryptographic call without making specific requests for any particular type of cryptographic feature. These cryptographic intents generally identify a strength of the encryption requested rather than calling for specific algorithms or encryption types. At step 508, the abstracted cryptographic API call is transmitted to a current cryptographic provider configured to translate the cryptographic intent into a cipher solution that could be implemented to achieve the outcome desired by the software application. Because the current cryptographic provider is able to act independently from the cryptographic adapter and software application it can be periodically updated to address any new cybersecurity threats without the need to make any changes to the software application or to the cryptographic adapter. At step 510, a response to the original cryptographic API call is generated by the cryptographic adapter and sent back to the software application. The response is generated based on a current determined state of the software application in a format matching expected legacy cryptographic provider responses.

For a new cryptographic call, this might only amount to an acknowledgment of the request received while for a cryptographic call that is part of an ongoing series of correspondence the response can include information received back from the current cryptographic provider and provided in a format that is consistent with a specific type of cryptographic API call requested by the software application.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A non-transitory computer-readable storage medium storing instructions configured to be executed by one or more processors to carry out steps that include:
   receiving one or more cryptographic API calls from a software application at a cryptographic adapter;
   processing the one or more cryptographic API calls to generate an abstracted cryptographic API call;
   transmitting the abstracted cryptographic API call to a current cryptographic provider; and
   transmitting a response to the software application in a format matching expected legacy cryptographic provider responses.

2. The non-transitory computer-readable storage medium of claim 1, wherein the steps further include:
   receiving a response from the current cryptographic provider at the cryptographic adapter;
   amending the response received from the current cryptographic provider to correspond to the format matching expected legacy cryptographic provider responses; and
   transmitting the amended response to the software application.

3. The non-transitory computer-readable storage medium of claim 2, wherein the response from the current cryptographic provider is an abstracted response presented in a format used natively by the cryptographic adapter.

4. The non-transitory computer-readable storage medium of claim 2, wherein amending the response comprises spoofing one or more return values not present in the response received from the current cryptographic provider so that the amended response corresponds to the format matching expected legacy cryptographic provider responses.

5. The non-transitory computer-readable storage medium of claim 1, wherein the one or more cryptographic API calls include a request to initiate secure communications.

6. The non-transitory computer-readable storage medium of claim 1, wherein the one or more cryptographic API calls include a request to perform one or more hashing functions.

7. The non-transitory computer-readable storage medium of claim 1, wherein the steps further include:
   tracking changes in a state of the software application based on the one or more cryptographic API calls, wherein the response to the software application is based at least in part on the state of the software application.

8. The non-transitory computer-readable storage medium of claim 1, wherein the one or more cryptographic API calls comprises a plurality of cryptographic API calls and the cryptographic adapter incorporates information contained in the plurality of cryptographic API calls into parameters of the abstracted cryptographic API call.

9. The non-transitory computer-readable storage medium of claim 1, wherein the abstracted cryptographic API call omits or makes changes to one or more parameters provided in the one or more cryptographic API calls.

10. The non-transitory computer-readable storage medium of claim 1, wherein processing the cryptographic API call comprises:
    determining an intent of the one or more cryptographic API calls and incorporating the intent into one or more parameters included in the abstracted cryptographic API call.

11. The non-transitory computer-readable storage medium of claim 1, wherein the intent is determined by identifying how the level of security requested compares with other levels of security utilized by the software application.

12. The non-transitory computer-readable storage medium of claim 1, wherein the response transmitted to the software application comprises an emulated certificate in the format matching expected legacy cryptographic provider responses.

13. A cryptographic adapter, comprising:
    one or more processors; and
        memory storing one or more programs configured to be executed by the one or more processors, the one or more programs including instructions for:
            receiving one or more cryptographic API calls from a software application;
            processing the one or more cryptographic API calls to generate an abstracted cryptographic API call;
            transmitting the abstracted cryptographic API call to a current cryptographic provider; and
            transmitting a response to the software application in a format matching expected legacy cryptographic provider responses.

14. The cryptographic adapter of claim 13, wherein the one or more programs include further instructions for:
    tracking changes in a state of the software application based on the one or more cryptographic API calls, wherein the response to the software application is based at least in part on the state of the software application.

15. A method of operating a cryptographic adapter, the method comprising:
    receiving one or more cryptographic API calls from a software application;
    tracking changes in a state of the software application based on the one or more cryptographic API calls;
    processing the one or more cryptographic API calls to generate an abstracted cryptographic API call;
    transmitting the abstracted cryptographic API call to a current cryptographic provider; and
    transmitting a response to the software application based on a current state of the software application and in a format matching expected legacy cryptographic provider responses.

* * * * *